United States Patent
Chang et al.

(10) Patent No.: US 11,621,723 B2
(45) Date of Patent: Apr. 4, 2023

(54) INPUT-SHAPING METHOD AND INPUT-SHAPING UNIT FOR GROUP-MODULATED INPUT SCHEME IN COMPUTING-IN-MEMORY APPLICATIONS

(71) Applicant: NATIONAL TSING HUA UNIVERSITY, Hsinchu (TW)

(72) Inventors: Fu-Chun Chang, Hsinchu (TW); Ta-Wei Liu, Hsinchu (TW); Cheng-Xin Xue, Hsinchu (TW); Sheng-Po Huang, Hsinchu (TW); Yen-Hsiang Huang, Hsinchu (TW); Meng-Fan Chang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 261 days.

(21) Appl. No.: 17/200,927

(22) Filed: Mar. 15, 2021

(65) Prior Publication Data

US 2022/0291963 A1    Sep. 15, 2022

(51) Int. Cl.
| | | |
|---|---|---|
| *H03M 7/30* | (2006.01) |
| *G06N 5/04* | (2023.01) |
| *G06F 21/32* | (2013.01) |
| *G06N 3/063* | (2023.01) |
| *G06F 9/50* | (2006.01) |
| *G06N 3/04* | (2023.01) |
| *G06F 9/46* | (2006.01) |

(52) U.S. Cl.
CPC .......... *H03M 7/3059* (2013.01); *G06F 9/466* (2013.01); *G06F 9/5016* (2013.01); *G06F 21/32* (2013.01); *G06N 3/04* (2013.01); *G06N 3/063* (2013.01); *G06N 5/04* (2013.01)

(58) Field of Classification Search
CPC ........ G06F 9/5016; G06F 9/466; G06F 21/32; H03M 7/3059; G06N 3/063; G06N 5/04; G06N 3/04; G06N 3/08
See application file for complete search history.

(56) References Cited

U.S. PATENT DOCUMENTS

2018/0300465 A1* 10/2018 Esman .................. G06F 21/316

\* cited by examiner

*Primary Examiner* — Joseph J Lauture
(74) *Attorney, Agent, or Firm* — CKC & Partners Co., LLC

(57) ABSTRACT

An input-shaping method for a group-modulated input scheme in a plurality of computing-in-memory applications is configured to shape a plurality of multi-bit input signals. The input-shaping method for the group-modulated input scheme in the plurality of computing-in-memory applications includes performing an input splitting step, a threshold setting step and an input shaping step. The input splitting step includes splitting the multi-bit input signals into a plurality of input sub-groups via an input-shaping unit. The threshold setting step includes setting at least one shaping threshold via the input-shaping unit. The input shaping step includes shaping at least one of the input sub-groups according to the at least one shaping threshold via the input-shaping unit to form a plurality of shaped multi-bit input signals so as to increase a probability of a bit equal to 0 occurring in the at least one of the input sub-groups.

20 Claims, 12 Drawing Sheets

INPUT-SHAPING METHOD AND INPUT-SHAPING UNIT FOR GROUP-MODULATED INPUT SCHEME IN COMPUTING-IN-MEMORY APPLICATIONS

BACKGROUND

Technical Field

The present disclosure relates to an input-shaping method and an input-shaping unit. More particularly, the present disclosure relates to an input-shaping method and an input-shaping unit for a group-modulated input scheme in a plurality of computing-in-memory applications.

Description of Related Art

Nowadays, most computing-in-memory (CIM) applications are AI-oriented applications. The memory mainly implements multiply-and-accumulate (MAC) functions to satisfy the neural networks' enormous inner product operations. As the input precision in the neural network increases, the operating time of CIM in processing multi-bit input will be lengthened compared to low-bit input, and the power consumption will also grow. CIM has three ways to process multi-bit inputs, and the three ways include a first way using serial word line (WL) input pulse counts, a second way using fully-decoded WL pulse-width and a third way using group-modulated inputs. The third way using group-modulated inputs has a shorter input operation time. However, when processing multi-bit inputs, the third way using group-modulated inputs still has a problem of increasing energy consumption, so how to reduce the energy consumption caused by CIM multi-bit input is a problem currently faced.

SUMMARY

According to one aspect of the present disclosure, an input-shaping method for a group-modulated input scheme in a plurality of computing-in-memory applications is configured to shape a plurality of multi-bit input signals. The input-shaping method for the group-modulated input scheme in the plurality of computing-in-memory applications includes performing an input splitting step, a threshold setting step and an input shaping step. The input splitting step includes splitting each of the multi-bit input signals into a plurality of input sub-groups via an input-shaping unit. The threshold setting step includes setting a plurality of shaping thresholds via the input-shaping unit. The shaping thresholds include a first round-up threshold, a round-down threshold and a second round-up threshold. The input shaping step includes shaping one of the input sub-groups according to the first round-up threshold and the round-down threshold, and then shaping another of the input sub-groups according to the second round-up threshold via the input-shaping unit to form a plurality of shaped multi-bit input signals so as to increase a probability of a bit equal to 0 occurring in the one and the another of the input sub-groups.

According to another aspect of the present disclosure, an input-shaping method for a group-modulated input scheme in a plurality of computing-in-memory applications is configured to shape a plurality of multi-bit input signals. The input-shaping method for the group-modulated input scheme in the plurality of computing-in-memory applications includes performing an input splitting step, a threshold setting step and an input shaping step. The input splitting step includes splitting the multi-bit input signals into a plurality of input sub-groups via an input-shaping unit. The threshold setting step includes setting at least one shaping threshold via the input-shaping unit. The input shaping step includes shaping at least one of the input sub-groups according to the at least one shaping threshold via the input-shaping unit to form a plurality of shaped multi-bit input signals so as to increase a probability of a bit equal to 0 occurring in the at least one of the input sub-groups.

According to further another aspect of the present disclosure, an input-shaping unit for a group-modulated input scheme in a plurality of computing-in-memory applications is configured to shape a plurality of multi-bit input signals. The input-shaping unit for the group-modulated input scheme in the plurality of computing-in-memory applications includes a comparing circuit and a logic circuit. The comparing circuit is configured to receive the multi-bit input signals and a plurality of shaping thresholds. Each of the multi-bit input signals are split into a plurality of input sub-groups, and the comparing circuit is configured to compare the input sub-groups with the shaping thresholds to generate a plurality of comparison results. The logic circuit is electrically connected to the comparing circuit. The logic circuit is configured to generate a plurality of shaped multi-bit input signals according to the comparison results. The shaping thresholds include a first round-up threshold, a round-down threshold and a second round-up threshold. The comparing circuit is configured to compare one of the input sub-groups with the first round-up threshold and the round-down threshold to generate one of the comparison results. The comparing circuit is configured to compare another of the input sub-groups with the second round-up threshold to generate another of the comparison results, and the logic circuit is configured to generate the shaped multi-bit input signals according to the one and the another of the comparison results so as to increase a probability of a bit equal to 0 occurring in the one and the another of the input sub-groups.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Before describing any embodiments in detail, some terms used in the following are described. A voltage level of "1" represents that the voltage is equal to a power supply voltage VDD. The voltage level of "0" represents that the voltage is equal to a ground voltage GND. A PMOS transistor and an NMOS transistor represent a P-type MOS transistor and an N-type MOS transistor, respectively. Each transistor has a source, a drain and a gate.

Figure 1:
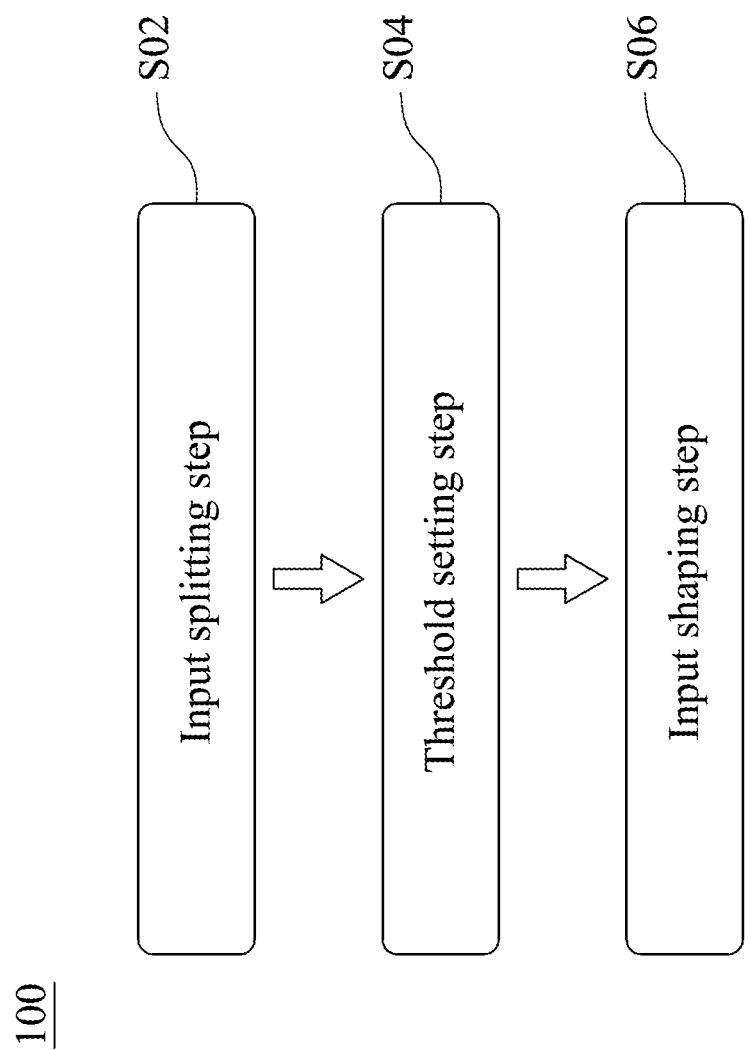
FIG. 1 shows a flow chart of an input-shaping method for a group-modulated input scheme in a plurality of computing-in-memory (CIM) applications according to a first embodiment of the present disclosure.
Figure 2:
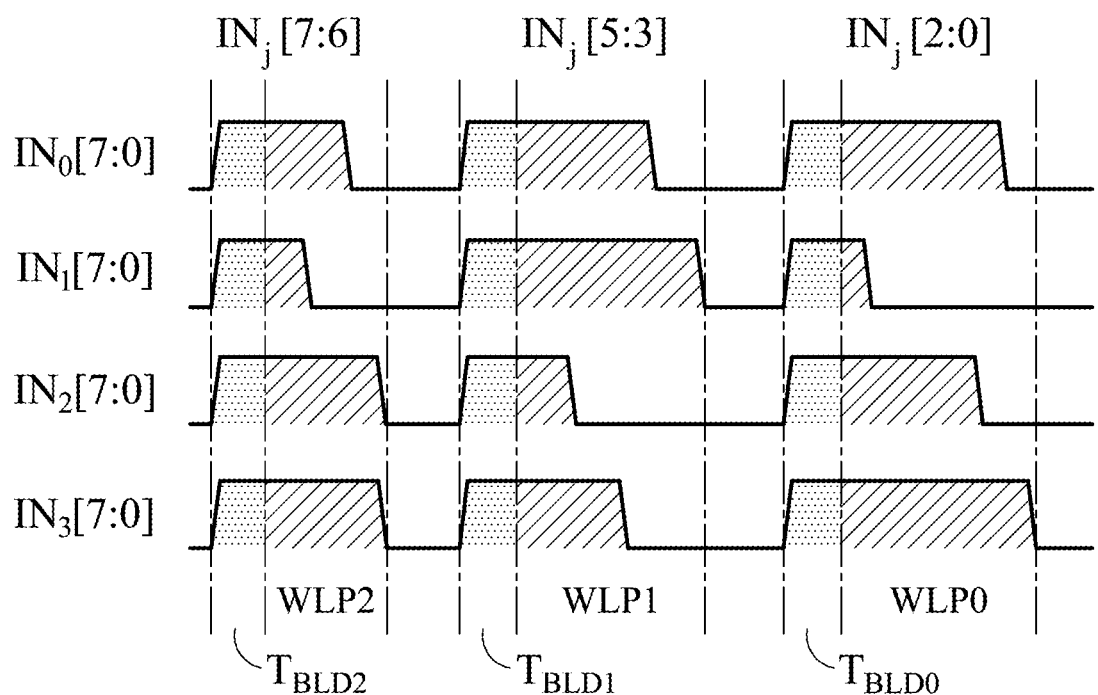
FIG. 2 shows a schematic view of an input splitting step of the input-shaping method of FIG. 1.
Figure 3:
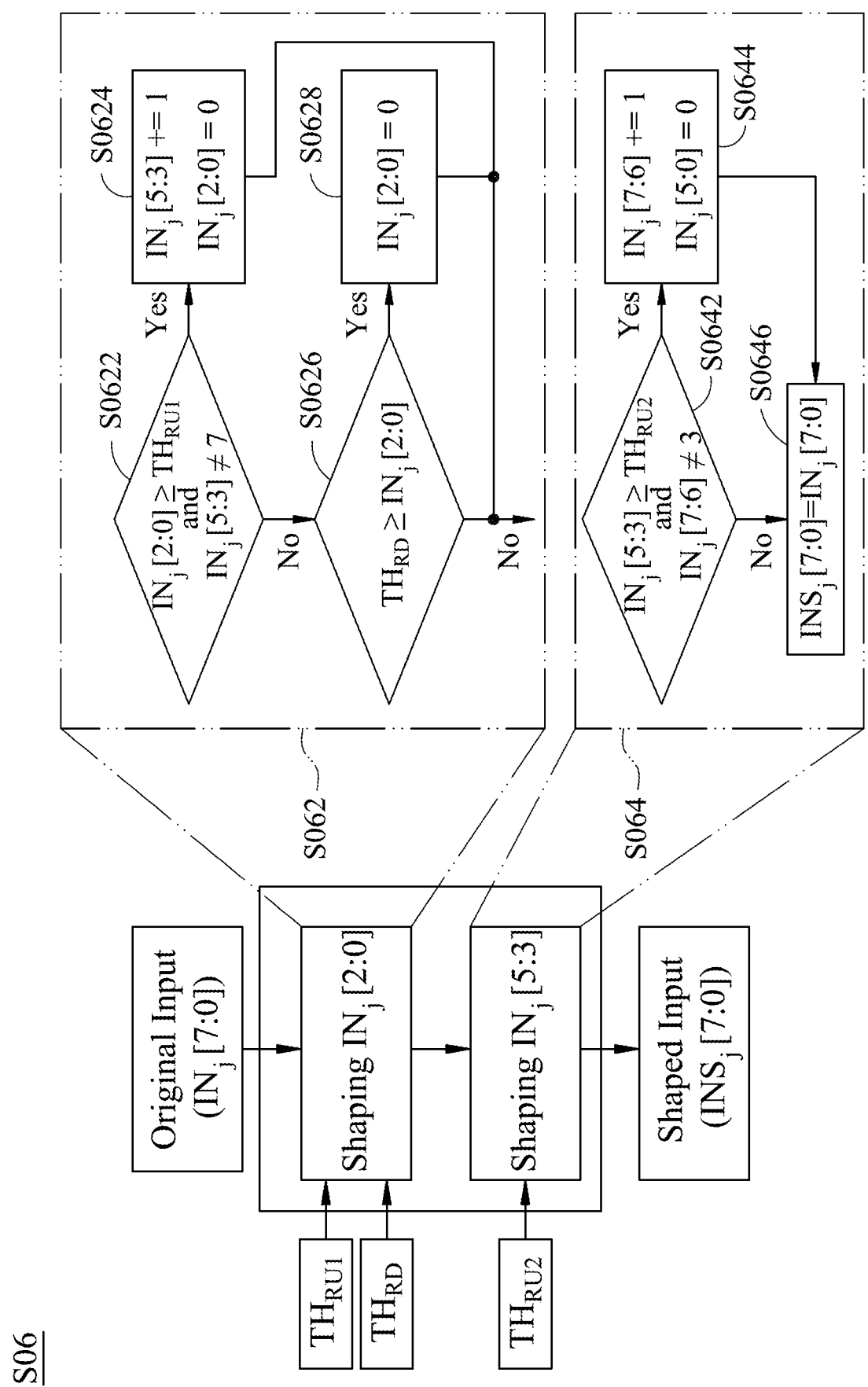
FIG. 3 shows a flow chart of an input shaping step of the input-shaping method for the group-modulated input scheme in the plurality of CIM applications of FIG. 1.

Please refer to FIGS. 1, 2 and 3. FIG. 1 shows a flow chart of an input-shaping method 100 for a group-modulated input scheme in a plurality of computing-in-memory (CIM) applications according to a first embodiment of the present disclosure. FIG. 2 shows a schematic view of an input splitting step S02 of the input-shaping method 100 of FIG. 1. FIG. 3 shows a flow chart of an input shaping step S06 of the input-shaping method 100 for the group-modulated input scheme in the plurality of CIM applications of FIG. 1. The input-shaping method 100 is configured to shape a plurality of multi-bit input signals (e.g., $IN_j[7:0]$, and j=0-3). The group-modulated input scheme represents that each of four 8-bit input signals $IN_0[7:0]$, $IN_1[7:0]$, $IN_2[7:0]$, $IN_3[7:0]$ may be split into three input sub-groups $IN_j[7:6]$, $IN_j[5:3]$, $IN_j[2:0]$ (2bit-3bit-3bit) with three corresponding input phases WLP2, WLP1, WLP0 by an input-shaping unit. In FIGS. 1-3, the input-shaping method 100 for the group-modulated input scheme in the plurality of CIM applications includes performing the input splitting step S02, a threshold setting step S04 and the input shaping step S06.

The input splitting step S02 includes splitting each of the multi-bit input signals $IN_j[7:0]$ into the input sub-groups $IN_j[7:6]$, $IN_j[5:3]$, $IN_j[2:0]$ via the input-shaping unit. In detail, the input splitting step S02 is corresponding to the group-modulated input scheme and is operated in three bit line developing time intervals $T_{BLD2}$, $T_{BLD1}$, $T_{BLD0}$ and three computing time intervals of the three input phases (e.g., WLP2, WLP1, WLP0), as shown in FIG. 2. The three input phases include a first input phase WLP2, a second input phase WLP1 and a third input phase WLP0. The computing time interval of the first input phase WLP2 follows the bit line developing time interval $T_{BLD2}$. The computing time interval of the second input phase WLP1 follows the bit line developing time interval $T_{BLD1}$ The computing time interval of the third input phase WLP0 follows the bit line developing time interval $T_{BLD0}$. Each of the multi-bit input signals $IN_0[7:0]$-$IN_3[7:0]$ has eight bits. The input sub-groups $IN_j[7:6]$, $IN_j[5:3]$, $IN_j[2:0]$ include a first input sub-group $IN_j[7:6]$, a second input sub-group $IN_j[5:3]$ and a third input sub-group $IN_j[2:0]$, and the first input sub-group $IN_j[7:6]$, the second input sub-group $IN_j[5:3]$ and the third input sub-group $IN_j[2:0]$ have two bits, three bits and three bits, respectively.

The threshold setting step S04 includes setting a plurality of shaping thresholds via the input-shaping unit. The shaping thresholds include a first round-up threshold $TH_{Ru1}$, a round-down threshold $TH_{RD}$ and a second round-up threshold $TH_{Ru2}$.

The input shaping step S06 includes shaping one (e.g., $IN_j[2:0]$) of the input sub-groups $IN_j[7:6]$, $IN_j[5:3]$, $IN_j[2:0]$ according to the first round-up threshold $TH_{Ru1}$ and the round-down threshold $TH_{RD}$, and then shaping another (e.g., $IN_j[5:3]$) of the input sub-groups $IN_j[7:6]$, $IN_j[5:3]$, $IN_j[2:0]$ according to the second round-up threshold $TH_{Ru2}$ via the input-shaping unit to form a plurality of shaped multi-bit input signals $INS_j[7:0]$ so as to increase a probability of a bit equal to 0 occurring in the one ($IN_j[2:0]$) and the another ($IN_j[5:3]$) of the input sub-groups $IN_j[7:6]$, $IN_j[5:3]$, $IN_j[2:0]$. In detail, each of the shaped multi-bit input signals $INS_j[7:0]$ has eight bits. The input shaping step S06 further includes a first shaping sub-step S062 and a second shaping sub-step S064.

The first shaping sub-step S062 includes a plurality of steps S0622, S0624, S0626, S0628. The step S0622 includes determining whether the third input sub-group $IN_j[2:0]$ is rounded up to the second input sub-group $IN_j[5:3]$ according to the first round-up threshold $TH_{Ru1}$. In response to determining that the third input sub-group $IN_j[2:0]$ is greater than or equal to the first round-up threshold $TH_{Ru1}$, and the second input sub-group $IN_j[5:3]$ is different from 7 (3'b111), the step S0624 is performed. The step S0624 includes adding the second input sub-group $IN_j[5:3]$ by 1, and setting the third input sub-group $IN_j[2:0]$ to 0. In other words, the step S0624 includes performing "$IN_j[5:3]+=1$" and "$IN_j[2:0]=0$". "$IN_j[5:3]+=1$" represents "$IN_j[5:3]=IN_j[5:3]+1$". "$IN_j[2:0]=0$" represents setting the third input sub-group $IN_j[2:0]$ to 0. In response to determining that the third input sub-group $IN_j[2:0]$ is smaller than the first round-up threshold $TH_{Ru1}$, or the second input sub-group $IN_j[5:3]$ is equal to 7 (3'b111), the step S0626 is performed. The step S0626 includes determining whether the third input sub-group $IN_j[2:0]$ is rounded down to 0 according to the round-down threshold $TH_{RD}$, i.e., the step S0626 includes checking whether the round-down threshold $TH_{RD}$ is greater than or equal to the third input sub-group $IN_j[2:0]$. In response to determining that the round-down threshold $TH_{RD}$ is greater than or equal to the third input sub-group $IN_j[2:0]$, the step S0628 is performed. The step S0628 includes setting the third input sub-group $IN_j[2:0]$ to 0. In response to determining that the round-down threshold $TH_{RD}$ is smaller than the third input sub-group $IN_j[2:0]$, the second shaping sub-step S064 is performed.

The second shaping sub-step S064 includes a plurality of steps S0642, S0644, S0646. The step S0642 includes determining whether the second input sub-group $IN_j[5:3]$ is rounded up to the first input sub-group $IN_j[7:6]$ according to the second round-up threshold $TH_{Ru2}$. In response to determining that the second input sub-group $IN_j[5:3]$ is greater than or equal to the second round-up threshold $TH_{Ru2}$, and the first input sub-group $IN_j[7:6]$ is different from 3 (2'b11), the step S0644 is performed. The step S0644 includes adding the first input sub-group ($IN_j[7:6]$) by 1, and setting the second input sub-group $IN_j[5:3]$ and the third input sub-group ($IN_j[2:0]$) to 0. In other words, the step S0644 includes performing "$IN_j[7:6]+=1$" and "$IN_j[5:0]=0$". "$IN_j[7:6]+=1$" represents "$IN_j[7:6]=IN_j[7:6]+1$". "$IN_j[5:0]=0$" represents setting the second input sub-group $IN_j[5:3]$ and the third input sub-group ($IN_j[2:0]$) to 0. In response to determining that the second input sub-group $IN_j[5:3]$ is smaller than the second round-up threshold $TH_{Ru2}$, or the first input sub-group $IN_j[7:6]$ is equal to 3 (2'b11), the step S0646 is performed. The step S0646 includes setting the shaped multi-bit input signals $INS_j[7:0]$ to the multi-bit input signals $IN_j[7:0]$.

Figure 4:
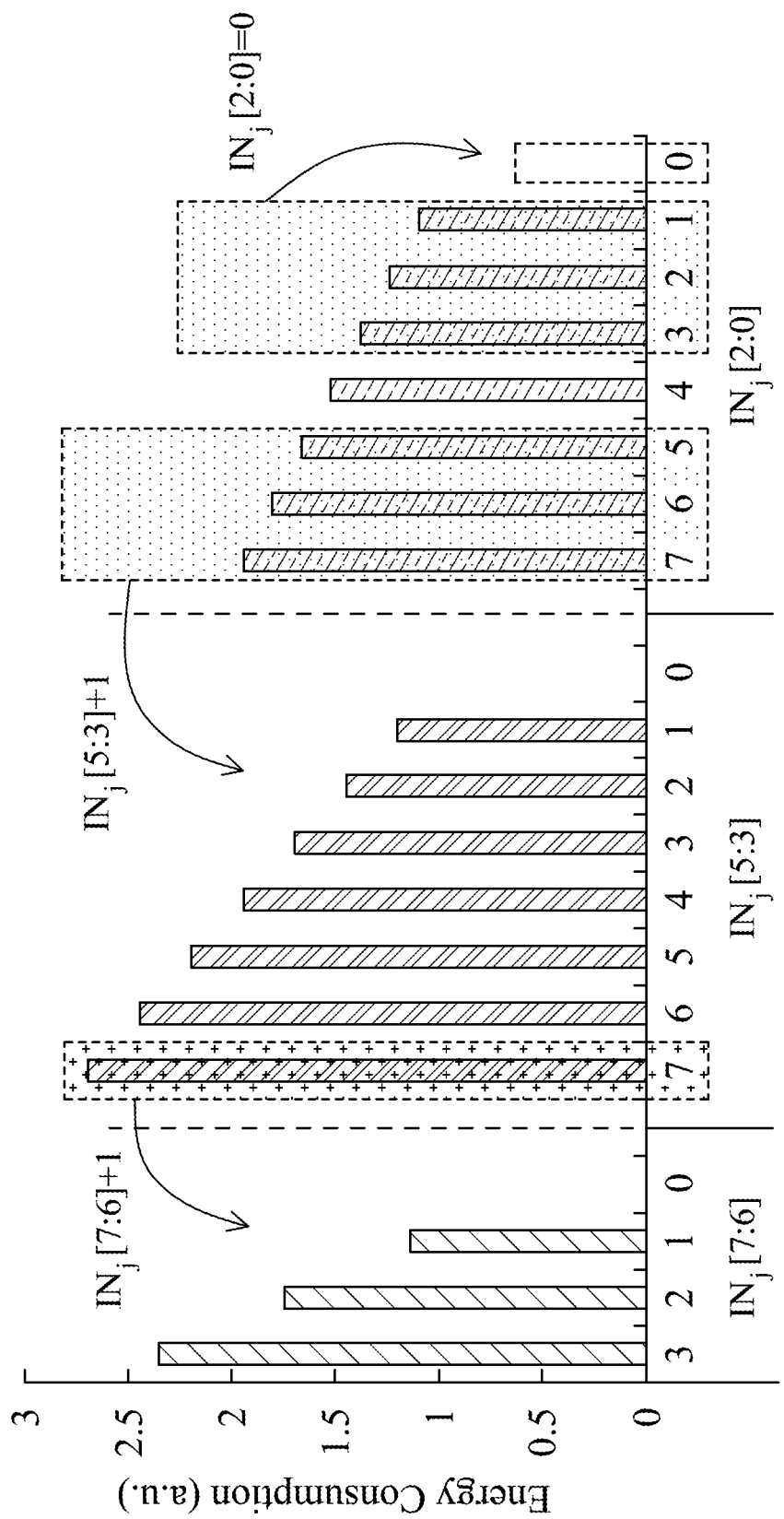
FIG. 4 shows energy consumption of each value of a plurality of input sub-groups of a multi-bit input signal.
Figure 5:
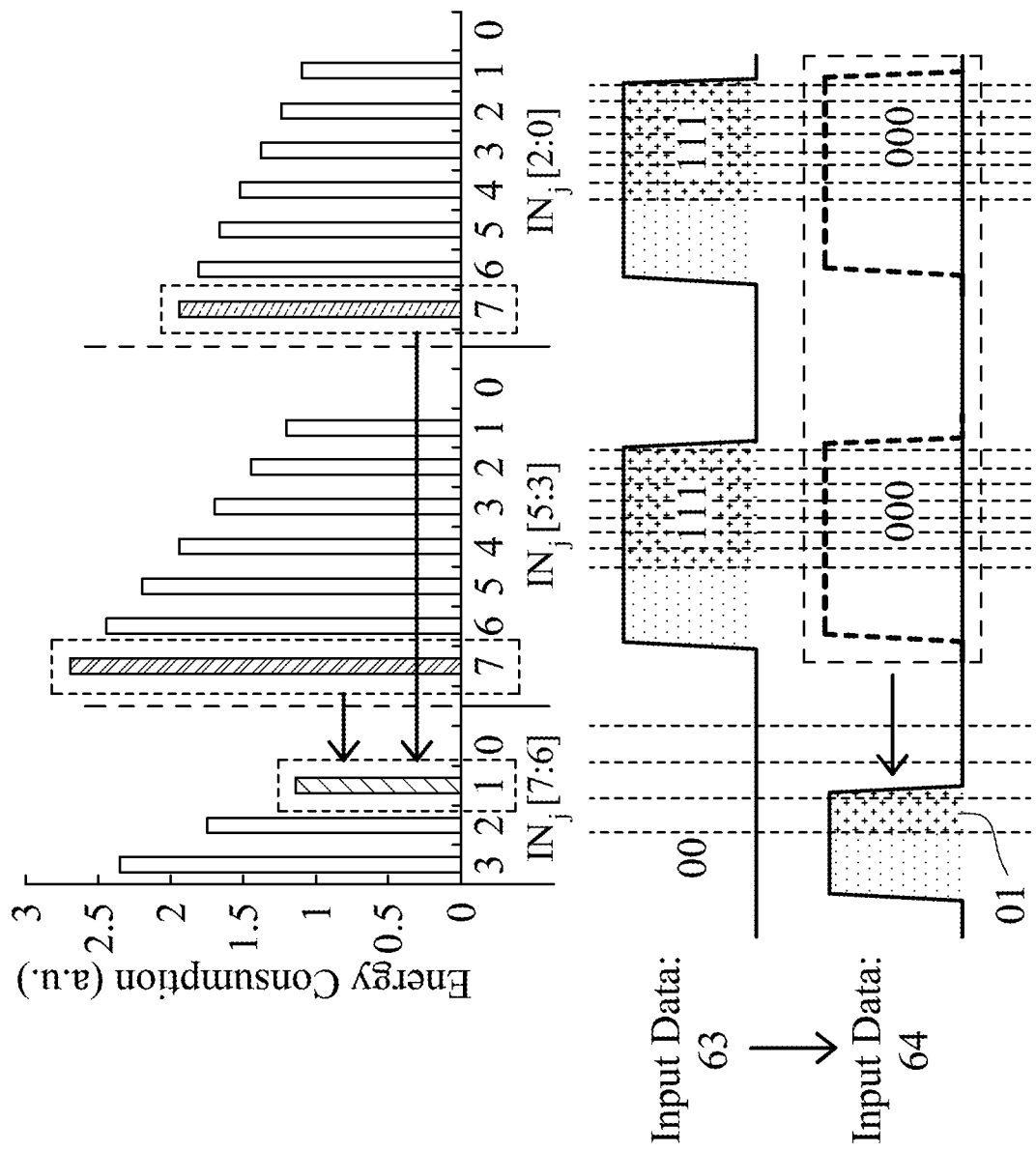
FIG. 5 shows a schematic view of a change of energy consumption of the multi-bit input signal changed from 63 to 64.

Please refer to FIGS. 1, 4 and 5. FIG. 4 shows energy consumption of each value of a plurality of input sub-groups $IN_j[7:6]$, $IN_j[5:3]$, $IN_j[2:0]$ of a multi-bit input signal $IN_j[7:0]$. FIG. 5 shows a schematic view of a change of energy consumption of the multi-bit input signal $IN_j[7:0]$ changed from 63 to 64. In FIG. 1, in the threshold setting step S04 of the input-shaping method 100, the first round-up threshold $TH_{Ru1}$, the round-down threshold $TH_{RD}$ and the second round-up threshold $TH_{Ru2}$ are set to 5, 3 and 7, respectively. In FIG. 4, the multi-bit input signal $IN_j[7:0]$ is transmitted by a word line. When the word line is turned on, and a weight is equal to 1, energy consumption of each value of the input sub-groups $IN_j[7:6]$, $IN_j[5:3]$, $IN_j[2:0]$ of the multi-bit input signal $IN_j[7:0]$ can be obtained. An 8-bit input (i.e., the multi-bit input signal $IN_j[7:0]$) is divided into the three input sub-groups $IN_j[7:6]$, $IN_j[5:3]$, $IN_j[2:0]$ (2bit-3bit-3bit) under the group-modulated input scheme for CIM. The three input sub-groups $IN_j[7:6]$, $IN_j[5:3]$, $IN_j[2:0]$ are respectively sent to a memory array for calculation. Before sending the three input sub-groups $IN_j[7:6]$, $IN_j[5:3]$, $IN_j[2:0]$ to the memory array, the three input sub-groups $IN_j[7:6]$, $IN_j[5:3]$, $IN_j[2:0]$ are shaped according to the shaping thresholds. The shaping thresholds including the first round-up threshold $TH_{Ru1}$, the round-down threshold $TH_{RD}$ and the second round-up threshold $TH_{Ru2}$ may be set by a user. Energy consumption caused by CIM after shaping (the shaped multi-bit input signal $INS_j[7:0]$) may be lower than before shaping (the multi-bit input signal $IN_j[7:0]$) because the multi-bit input signal $IN_j[7:0]$ with high energy consumption may be shaped to the shaped multi-bit input signal $INS_j[7:0]$ with lower energy consumption. For example, a value of 63 (63=8'b00111111) may be divided into three input sub-groups ($IN_j[7:6]=0$, $IN_j[5:3]=7$, $IN_j[2:0]=7$). The latter two input sub-groups $IN_j[5:3]$, $IN_j[2:0]$ require 14 unit time periods to complete an input operation. When the value of 63 is converted to another value of 64 (64=8'b01000000, $INS_j[7:6]=1$, $INS_j[5:3]=0$, $INS_j[2:0]=0$), only the first input sub-group $IN_j[7:6]$ requires one unit time period. Energy consumption of the latter two input sub-groups $IN_j[5:3]$, $IN_j[2:0]$ can be saved, so that the input-shaping method 100 for the group-modulated input scheme in the plurality of CIM applications of the present disclosure can achieve the purpose of saving energy. The user can also adjust the shaping thresholds ($TH_{Ru1}$, $TH_{RD}$ and $TH_{Ru2}$) to save more energy.

Figure 6:
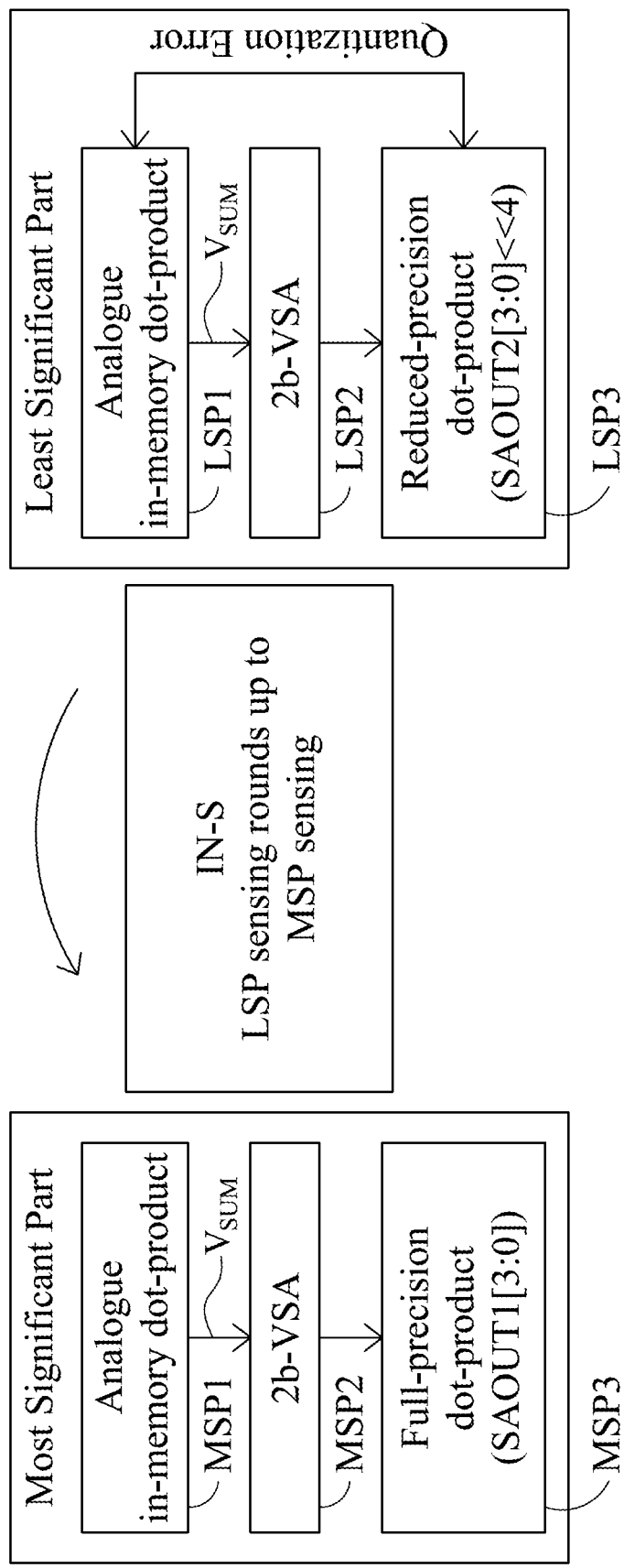
FIG. 6 shows a schematic view of a least significant part (LSP) sensing rounded up to a most significant part (MSP) sensing.

FIG. 6 shows a schematic view of a least significant part (LSP) sensing rounded up to a most significant part (MSP) sensing. The LSP sensing includes a first sensing step LSP1, a second sensing step LSP2 and a third sensing step LSP3. The first sensing step LSP1 is represented by "Analogue in-memory dot-product". The first sensing step LSP1 includes performing a multiply-and-accumulate (MAC) operation and generating an output voltage $V_{SUM}$. The second sensing step LSP2 is represented by "2b-VSA" and includes transferring a multi-bit output value from the first sensing step LSP1 to a multi-bit digital output value (e.g., SAOUT2[3:0]) via a plurality of sense amplifiers. Each of the sense amplifiers may be a 2-bit voltage sense amplifier 2b-VSA. The third sensing step LSP3 is represented by "Reduced-precision dot-product (SAOUT2[3:0]<<4)" and includes sensing the multi-bit input signal $IN_j[7:0]$ with reduced-precision readout. In addition, the MSP sensing includes a first sensing step MSP1, a second sensing step MSP2 and a third sensing step MSP3. The first sensing step MSP1 and second sensing step MSP2 are the same as the first sensing step LSP1 and the second sensing step LSP2, respectively. The third sensing step MSP3 is represented by "Full-precision dot-product (SAOUT1[3:0])" and includes sensing the multi-bit input signal $IN_j[7:0]$ with full-precision readout.

In general, conventional CIM applications are equipped with a hybrid-precision readout scheme to save energy. The Hybrid-precision readout scheme represents dividing the multi-bit input signal $IN_j[7:0]$ into full-precision readout and reduced-precision readout according to a place value. The conventional CIM applications finetune the neural network with the hybrid-precision readout scheme to rescue inference accuracy loss. However, in the input-shaping method 100 of the present disclosure, the inference accuracy can be improved without finetuning. There are two reasons to achieve the inference accuracy improvement. First, the shaped multi-bit input signal $INS_j[7:0]$ has a higher chance of being carried to the high place value part with full-precision readout. Second, the accumulated quantization error caused by reduced-precision readout can be decreased due to the input shaping step S06 of the input-shaping method 100. Accordingly, compared with the conventional CIM applications, the input-shaping method 100 of the present disclosure mainly reduces the energy consumption of CIM in processing the multi-bit input signal $IN_j[7:0]$. Furthermore, the input-shaping method 100 of the present disclosure can improve the inference accuracy without finetuning.

Figure 7:
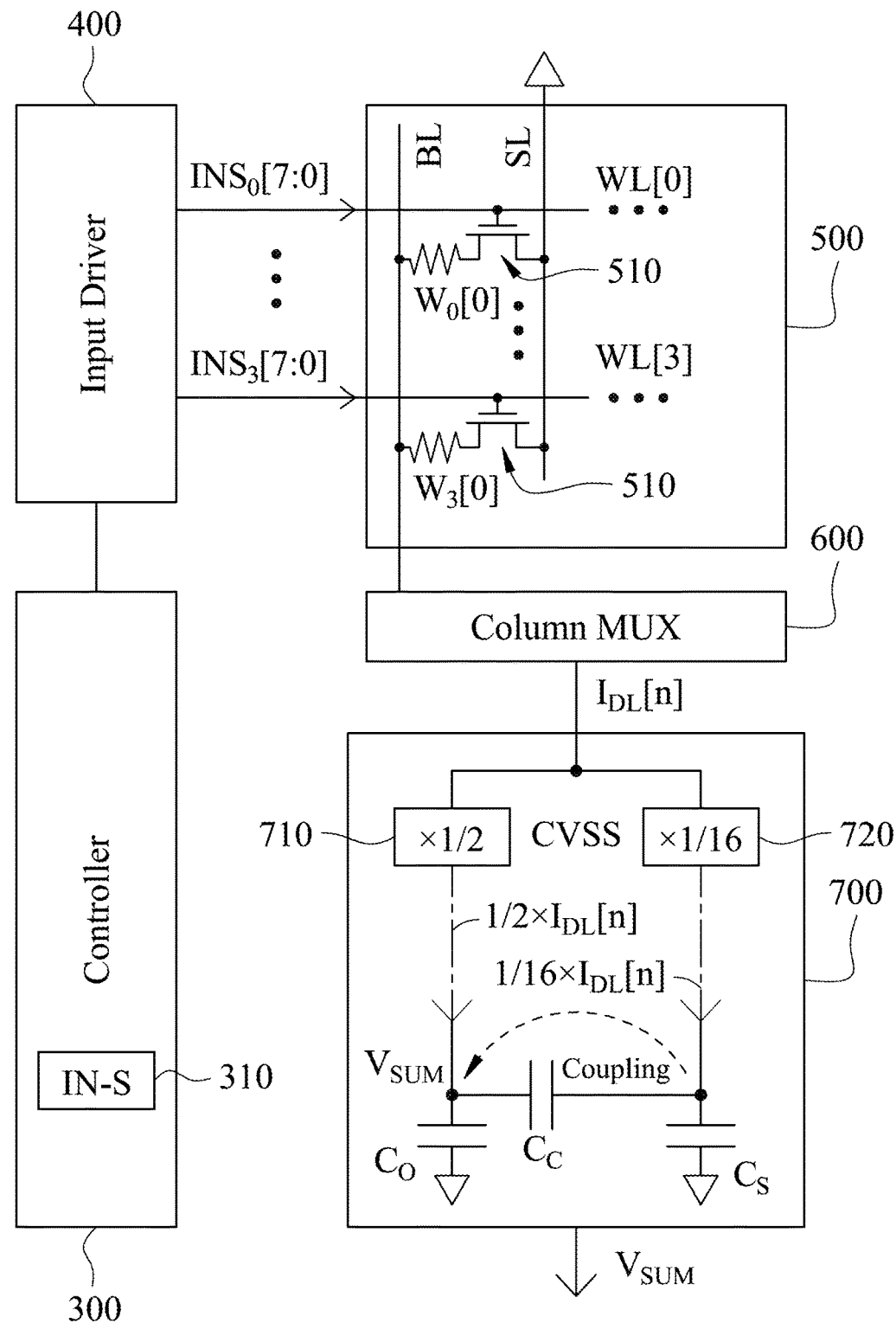
FIG. 7 shows a block diagram of a memory structure for a group-modulated input scheme in a plurality of CIM applications according to a second embodiment of the present disclosure.
Figure 8:
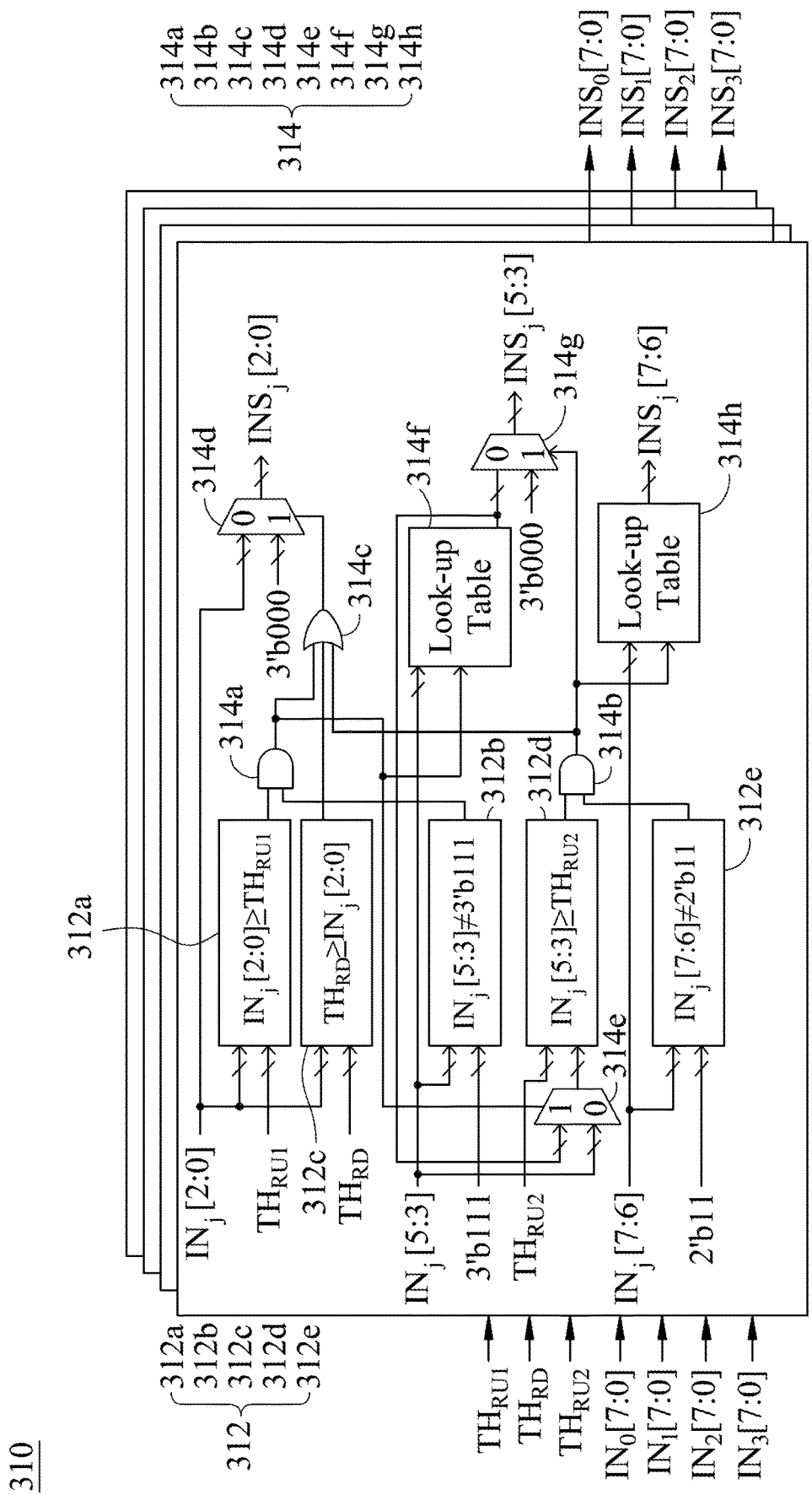
FIG. 8 shows a block diagram of an input-shaping unit of the memory structure of FIG. 7.

Please refer to FIGS. 7 and 8. FIG. 7 shows a block diagram of a memory structure 200 for a group-modulated input scheme in a plurality of CIM applications according to a second embodiment of the present disclosure. FIG. 8 shows a block diagram of an input-shaping unit 310 of the memory structure 200 of FIG. 7. The memory structure 200 includes a controller 300, a word line driver 400, a memory array 500, a column multiplexer 600 and a current-to-voltage signal stacking (CVSS) converter 700.

The controller 300 is electrically connected to the memory array 500 via the word line driver 400. The controller 300 is represented by "Controller" and includes the input-shaping unit 310 represented by "IN-S". The input-shaping unit 310 is configured to split the multi-bit input signals $IN_0[7:0]$-$IN_3[7:0]$ into the input sub-groups $IN_j[7:6]$, $IN_j[5:3]$, $IN_j[2:0]$, and then shape the multi-bit input signals $IN_0[7:0]$-$IN_3[7:0]$ to the shaped multi-bit input signals $INS_0[7:0]$-$INS_3[7:0]$ (i.e., $INS_j[7:0]$, and j=0-3). The shaped multi-bit input signals $INS_j[7:0]$ are sequentially inputted to the word lines WL[0]-WL[3]. The input-shaping unit 310 includes a comparing circuit 312 and a logic circuit 314.

The comparing circuit 312 is configured to receive the multi-bit input signals $IN_0[7:0]$-$IN_3[7:0]$ and a plurality of shaping thresholds. Each of the multi-bit input signals $IN_0[7:0]$-$IN_3[7:0]$ are split into a plurality of input sub-groups $IN_j[7:6]$, $IN_j[5:3]$, $IN_j[2:0]$, and the comparing circuit 312 is configured to compare the input sub-groups $IN_j[7:6]$, $IN_j[5:3]$, $IN_j[2:0]$ with the shaping thresholds to generate a plurality of comparison results. In detail, the shaping thresholds include a first round-up threshold $TH_{Ru1}$, a round-down threshold $TH_{RD}$ and a second round-up threshold $TH_{Ru2}$. The comparing circuit 312 is configured to compare one (e.g., $IN_j[2:0]$) of the input sub-groups $IN_j[7:6]$, $IN_j[5:3]$, $IN_j[2:0]$ with the first round-up threshold $TH_{Ru1}$ and the round-down threshold $TH_{RD}$ to generate one of the comparison results. The comparing circuit 312 is configured to compare another (e.g., $IN_j[5:3]$) of the input sub-groups $IN_j[7:6]$, $IN_j[5:3]$, $IN_j[2:0]$ with the second round-up threshold $TH_{Ru2}$ to generate another of the comparison results. The comparing circuit 312 includes a first comparator 312a, a second comparator 312b, a third comparator 312c, a fourth comparator 312d and a fifth comparator 312e. The first comparator 312a is configured to compare the third input sub-group $IN_j[2:0]$ with the first round-up threshold $TH_{Ru1}$. The second comparator 312b is configured to compare the second input sub-group $IN_j[5:3]$ with 7 (3'b111). The third comparator 312c is configured to compare the round-down threshold $TH_{RD}$ with the third input sub-group $IN_j[2:0]$. The fourth comparator 312d is configured to compare the second input sub-group $IN_j[5:3]$ with the second round-up threshold $TH_{Ru2}$. The fifth comparator 312e is configured to compare the first input sub-group $IN_j[7:6]$ with 3 (2'b11). Each of the first comparator 312a, the second comparator 312b, the third comparator 312c and the fourth comparator 312d is a 3-bit comparator. The fifth comparator 312e is a 2-bit comparator.

The logic circuit 314 is electrically connected to the comparing circuit 312. The logic circuit 314 is configured to generate the shaped multi-bit input signals $INS_j[7:0]$ according to the comparison results. The logic circuit 314 is configured to generate the shaped multi-bit input signals $INS_j[7:0]$ according to the one and the another of the comparison results so as to increase a probability of a bit equal to 0 occurring in the one (e.g., $IN_j[2:0]$) and the another (e.g., $IN_j[5:3]$) of the input sub-groups $IN_j[7:6]$, $IN_j[5:3]$, $IN_j[2:0]$. In detail, the logic circuit 314 includes a first logic module 314a, a second logic module 314b, a third logic module 314c, a fourth logic module 314d, a fifth logic module 314e, a sixth logic module 314f, a seventh logic module 314g and an eighth logic module 314h. The first logic module 314a is electrically connected to the first comparator 312a and the second comparator 312b. The second logic module 314b is electrically connected to the fourth comparator 312d and the fifth comparator 312e. The third logic module 314c is electrically connected to the first logic module 314a, the third comparator 312c and the second logic module 314b. The fourth logic module 314d is electrically connected to the first comparator 312a, the third comparator 312c and the third logic module 314c. The fifth logic module 314e is electrically connected to the second comparator 312b, the fourth comparator 312d, the first logic module 314a and the sixth logic module 314f. The sixth logic module 314f is electrically connected to the second comparator 312b and the first logic module 314a. The seventh logic module 314g is electrically connected to the second logic module 314b, the third logic module 314c, the fifth logic module 314e and the sixth logic module 314f. The eighth logic module 314h is electrically connected to the fifth comparator 312e, the second logic module 314b, the third logic module 314c and the seventh logic module 314g. Each of the first logic module 314a and the second logic module 314b may be an AND gate. The third logic module 314c may be an OR gate. Each of the fourth logic module 314d, the fifth logic module 314e and the seventh logic module 314g may be a multiplexer. Each of the sixth logic module 314f and the eighth logic module 314h is represented by "Look-up Table" and configured to perform an adding operation.

Each of the multi-bit input signals $IN_0[7:0]$-$IN_3[7:0]$ and the shaped multi-bit input signals $INS_0[7:0]$-$INS_3[7:0]$ has eight bits. The input sub-groups $IN_j[7:6]$, $IN_j[5:3]$, $IN_j[2:0]$ include a first input sub-group $IN_j[7:6]$, a second input sub-group $IN_j[5:3]$ and a third input sub-group $IN_j[2:0]$, and the first input sub-group $IN_j[7:6]$, the second input sub-group $IN_j[5:3]$ and the third input sub-group $IN_j[2:0]$ have two bits, three bits and three bits, respectively. In response to determining that the third input sub-group $IN_j[2:0]$ is greater than or equal to the first round-up threshold $TH_{Ru1}$, and the second input sub-group $IN_j[5:3]$ is different from 7 (3'b111), the third input sub-group $IN_j[2:0]$ is set to 0, and the second input sub-group $IN_j[5:3]$ is added by 1. In response to determining that the round-down threshold $TH_{RD}$ is greater than or equal to the third input sub-group $IN_j[2:0]$, the third input sub-group $IN_j[2:0]$ is set to 0. In response to determining that the second input sub-group $IN_j[5:3]$ is greater than or equal to the second round-up threshold $TH_{Ru2}$, and the first input sub-group $IN_j[7:6]$ is different from 3 (2'b11), the second input sub-group $IN_j[5:3]$ and the third input sub-group $IN_j[2:0]$ are set to 0, and the first input sub-group $IN_j[7:6]$ is added by 1.

The word line driver 400 is connected to the non-volatile memory cells 510 via the word lines WL[0]-WL[3]. The word line driver 400 is represented by "Input Driver" and is located on a top side of the controller 300. The word line driver 400 generates the voltage levels of the shaped multi-bit input signals $INS_0[7:0]$-$INS_3[7:0]$ to control the memory array 500 via the word lines WL[0]-WL[3].

The memory array 500 includes a plurality of non-volatile memory cells 510, a source line SL and a bit line BL. The non-volatile memory cells 510 are controlled by the word lines WL[0]-WL[3] to generate a plurality of memory cell currents and stores the weights $W_0[0]$-$W_3[0]$. The word lines WL[0]-WL[3] transmit the shaped multi-bit input signals $INS_0[7:0]$-$INS_3[7:0]$, respectively. The source line SL is electrically connected to one end of each of the non-volatile memory cells 510. The bit line BL is electrically connected to another end of each of the non-volatile memory cells 510 and has a bit-line current. The bit-line current is equal to a sum of the memory cell currents. Each of the non-volatile memory cells 510 includes a resistive element and a transistor. The resistive element is electrically connected to the bit line BL and stores one of the weights $W_0[0]$-$W_3[0]$. The transistor is electrically connected between the resistive element and the source line SL. The source line SL is coupled to the ground voltage. The resistive element is in one of a high resistance state (HRS) and a low resistance state (LRS). The transistor is the NMOS transistor. In one embodiment, each of the non-volatile memory cells 510 may be a 1-transistor 1-resistor (1T1R) ReRAM cell.

The column multiplexer 600 is electrically connected between each of the non-volatile memory cells 510 and the CVSS converter 700. The column multiplexer 600 is represented by "Column MUX" and is located on a bottom side of the memory array 500. The column multiplexer 600 receives the bit-line current and generates a dataline current $I_{DL}[n]$ according to the bit-line current. n represents an integer value, such as 0-63.

The CVSS converter 700 is electrically connected to the non-volatile memory cells 510 via the bit line BL and the column multiplexer 600. The CVSS converter 700 is represented by "CVSS" and is located on a bottom side of the column multiplexer 600. The CVSS converter 700 includes a first sub-converter 710, a second sub-converter 720, a coupling capacitor $C_C$, an output capacitor $C_O$ and a stacking capacitor $C_S$. The first sub-converter 710 is electrically connected to the coupling capacitor $C_C$ and the output capacitor $C_O$. The second sub-converter 720 is electrically connected to the coupling capacitor $C_C$ and the stacking capacitor $C_S$. The first sub-converter 710 receives the dataline current $I_{DL}[n]$ and generates one-half of the dataline current $I_{DL}[n]$ (i.e., $\frac{1}{2} \times I_{DL}[n]$). The second sub-converter 720 receives the dataline current $I_{DL}[n]$ and generates one-sixteenth of the dataline current $I_{DL}[n]$ (i.e., $\frac{1}{16} \times I_{DL}[n]$). The CVSS converter 700 is controlled by the controller 300 and converts the dataline current $I_{DL}[n]$ into the converted voltages according to the shaped multi-bit input signals $INS_j[7:0]$. The shaped multi-bit input signals $INS_j[7:0]$ include three shaped input sub-groups $INS_j[7:6]$, $INS_j[5:3]$, $INS_j[2:0]$. The CVSS converter 700 stacks the converted voltages to form the output voltage $V_{SUM}$, and the output voltage $V_{SUM}$ is corresponding to a sum of a plurality of multiplication values which are equal to the shaped multi-bit input signals $INS_0[7:0]$-$INS_3[7:0]$ multiplied by the weights $W_0[0]$-$W_3[0]$.

Therefore, the input-shaping unit 310 of the present disclosure can generate the shaped multi-bit input signal $INS_j[7:0]$ which has the higher chance of being carried to the high place value part with full-precision readout. The accumulated quantization error caused by reduced-precision readout can be decreased due to the input-shaping unit 310. Accordingly, compared with the conventional CIM applications, the input-shaping unit 310 of the present disclosure mainly reduces the energy consumption of CIM in processing the multi-bit input signal $IN_j[7:0]$. Furthermore, the input-shaping unit 310 of the present disclosure can improve the inference accuracy without finetuning.

Figure 9:
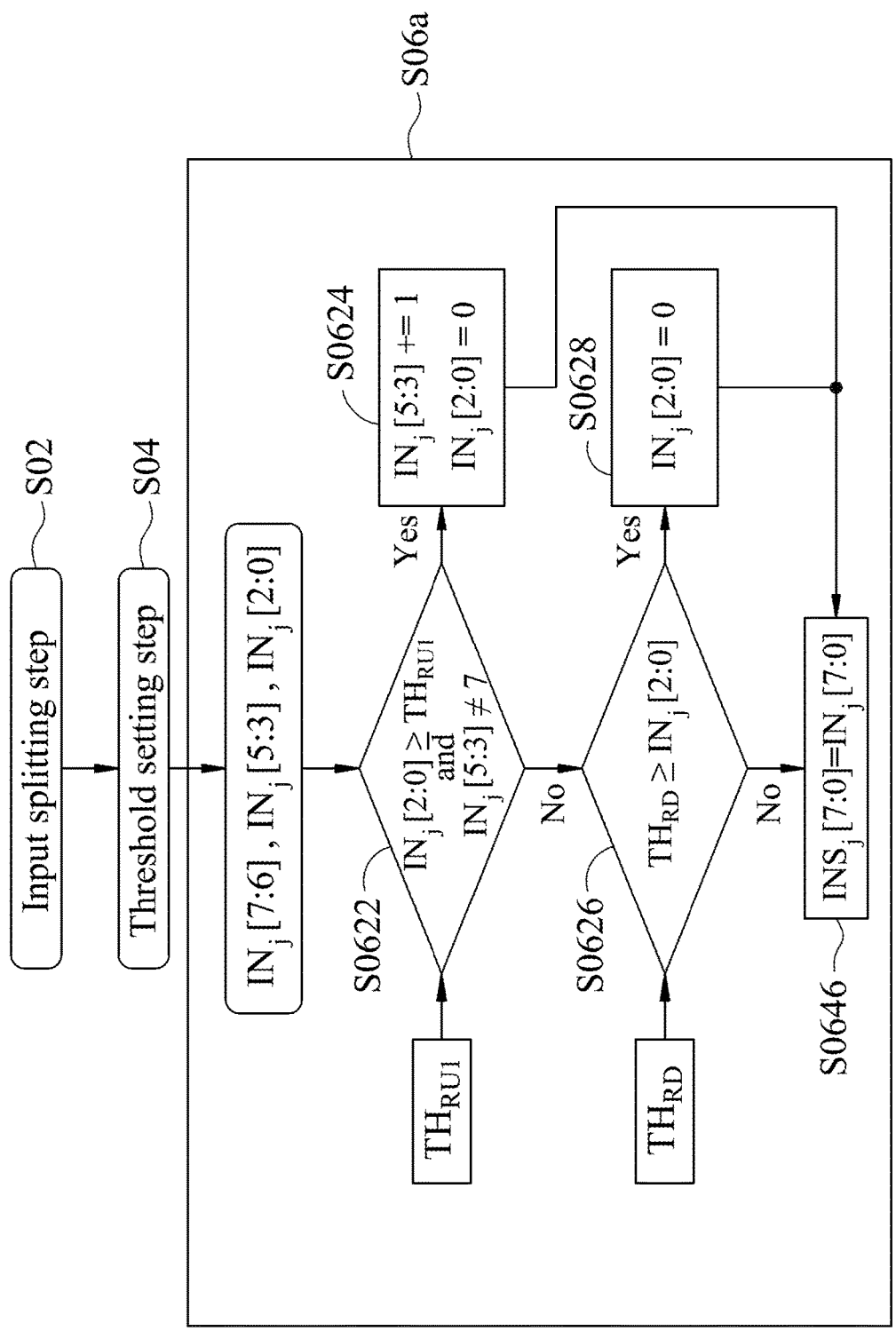
FIG. 9 shows a flow chart of an input-shaping method for a group-modulated input scheme in a plurality of CIM applications according to a third embodiment of the present disclosure.

Please refer to FIGS. 1, 3 and 9. FIG. 9 shows a flow chart of an input-shaping method 100a for a group-modulated input scheme in a plurality of CIM applications according to a third embodiment of the present disclosure. The input-shaping method 100a for the group-modulated input scheme in the plurality of CIM applications includes performing an input splitting step S02, a threshold setting step S04 and an input shaping step S06a.

The detail of the input splitting step S02 and the threshold setting step S04 is the same as the embodiment of FIG. 1, and will not be described again herein. The input shaping step S06a includes shaping the third input sub-group $IN_j[2:0]$ according to the first round-up threshold $TH_{Ru1}$ and the round-down threshold $TH_{RD}$ via an input-shaping unit to form a plurality of shaped multi-bit input signals $INS_j[7:0]$ so as to increase a probability of a bit equal to 0 occurring in the third input sub-group $IN_j[2:0]$. The input shaping step S06a includes a plurality of steps S0622, S0624, S0626, S0628, S0646. The steps S0622, S0624, S0626, S0628 are the same as the steps S0622, S0624, S0626, S0628 of the first shaping sub-step S062 of FIG. 3, respectively. The step S0646 is the same as the step S0646 of the second shaping sub-step S064 of FIG. 3. Therefore, compared with the conventional CIM applications, the input-shaping method 100a of the present disclosure mainly reduces the energy consumption of CIM in processing the multi-bit input signal $IN_j[7:0]$. Furthermore, the input-shaping method 100a of the present disclosure can improve the inference accuracy without finetuning.

Figure 10:
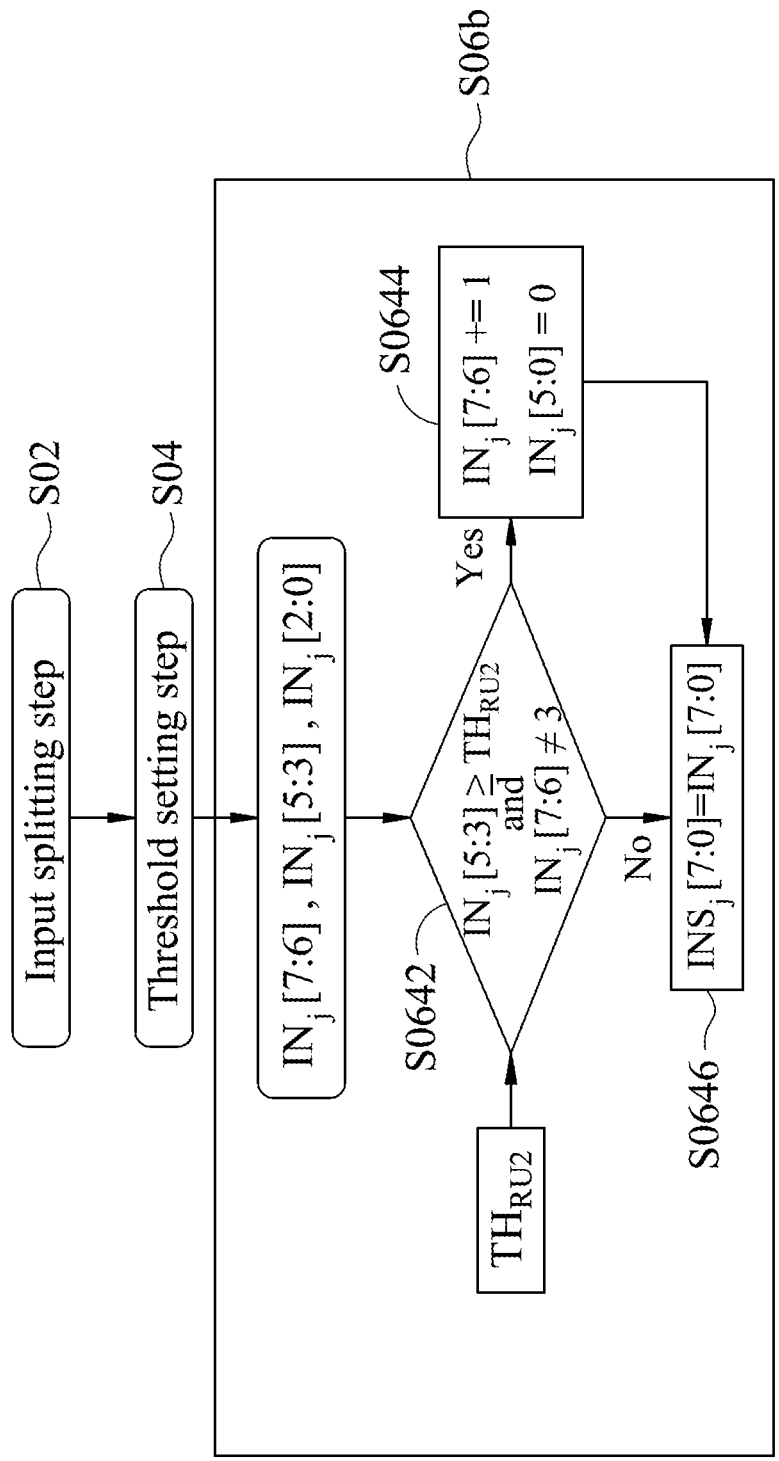
FIG. 10 shows a flow chart of an input-shaping method for a group-modulated input scheme in a plurality of CIM applications according to a fourth embodiment of the present disclosure.

Please refer to FIGS. 1, 3 and 10. FIG. 10 shows a flow chart of an input-shaping method 100b for a group-modulated input scheme in a plurality of CIM applications according to a fourth embodiment of the present disclosure. The input-shaping method 100b for the group-modulated input scheme in the plurality of CIM applications includes performing an input splitting step S02, a threshold setting step S04 and an input shaping step S06b.

The detail of the input splitting step S02 and the threshold setting step S04 is the same as the embodiment of FIG. 1, and will not be described again herein. The input shaping step S06b includes shaping the second input sub-group $IN_j[5:3]$ according to the second round-up threshold $TH_{RU2}$ via an input-shaping unit to form a plurality of shaped multi-bit input signals $INS_j[7:0]$ so as to increase a probability of a bit equal to 0 occurring in the second input sub-group $IN_j[5:3]$. The input shaping step S06b includes a plurality of steps S0642, S0644, S0646. The steps S0642, S0644, S0646 are the same as the steps S0642, S0644, S0646 of the second shaping sub-step S064 of FIG. 3, respectively. Therefore, compared with the conventional CIM applications, the input-shaping method 100b of the present disclosure mainly reduces the energy consumption of CIM in processing the multi-bit input signal $IN_j[7:0]$. Furthermore, the input-shaping method 100b of the present disclosure can improve the inference accuracy without finetuning.

Figure 12:
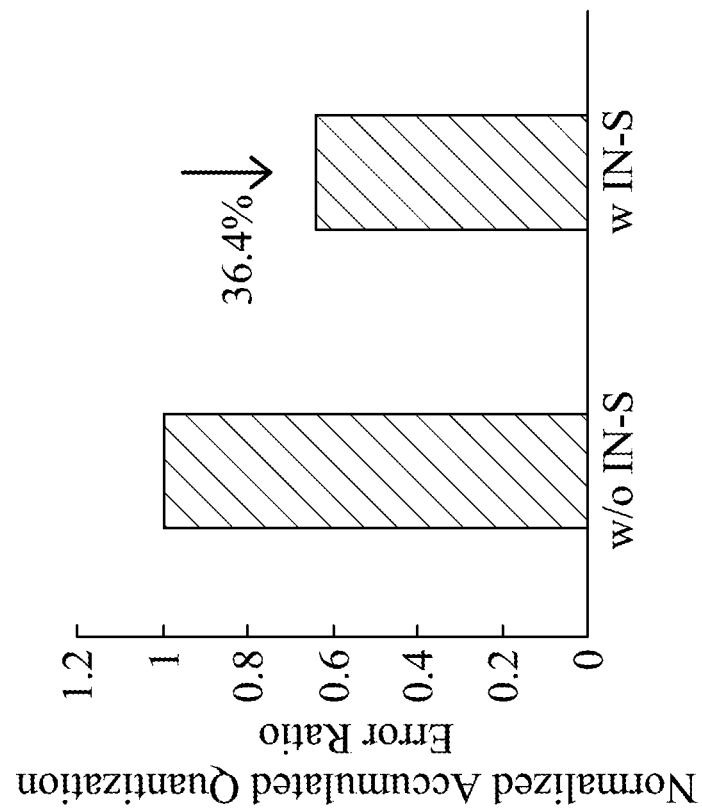
FIG. 12 shows a comparison result of normalized accumulated quantization error ratios between the conventional method and the input-shaping method of the present disclosure.
Figure 11:
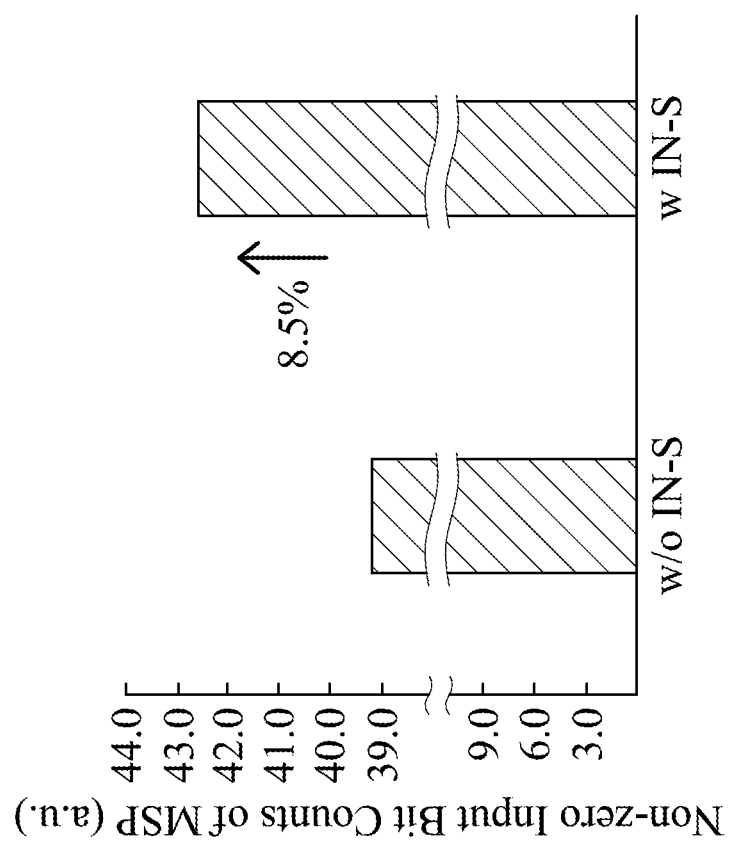
FIG. 11 shows a comparison result of non-zero input bit counts of MSP between a conventional method and the input-shaping method of the present disclosure.
Figures 13, 14:
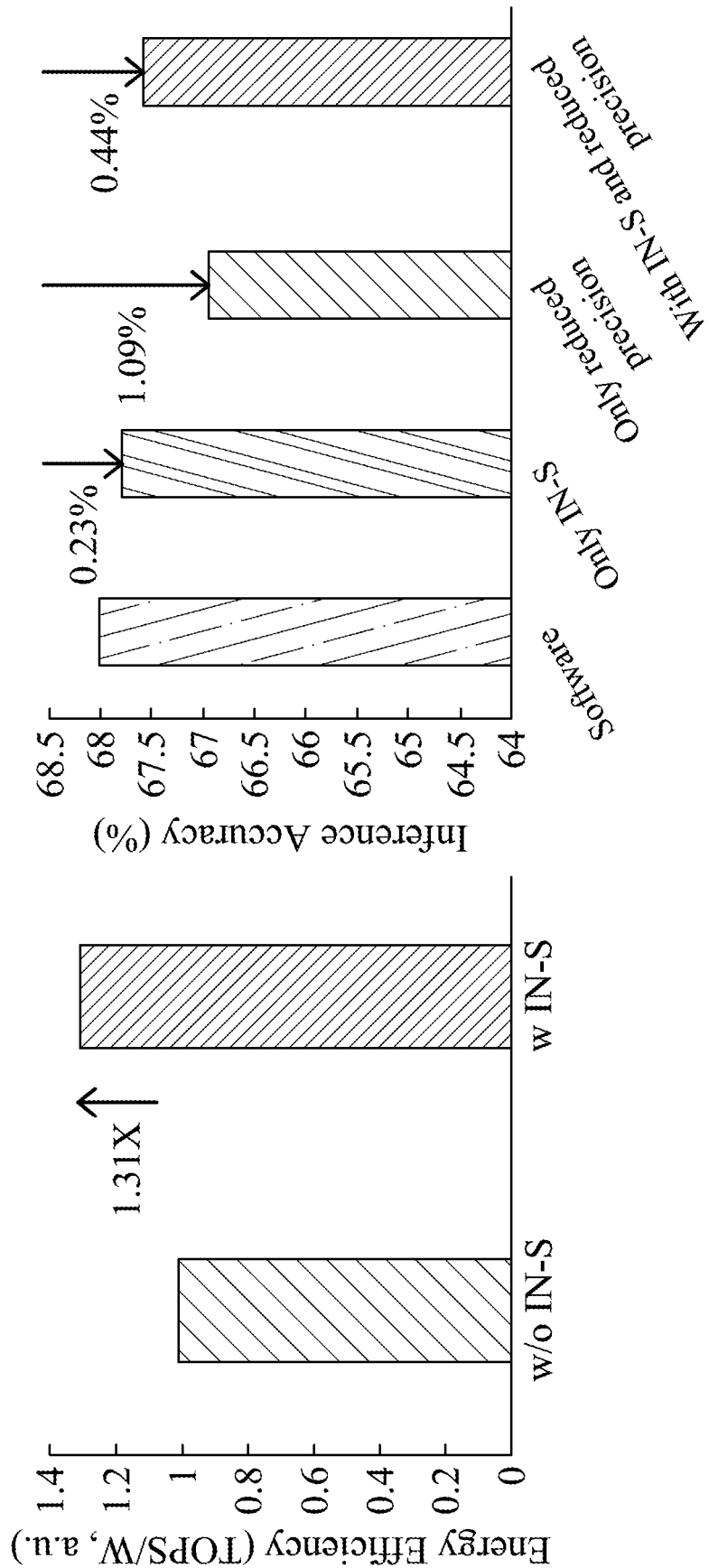
FIG. 13 shows a comparison result of energy efficiency between the conventional method and the input-shaping method of the present disclosure.
FIG. 14 shows a comparison result of inference accuracy among a first method (software), a second method (only IN-S), a third method (only reduced precision) and a fourth method (with IN-S and reduced precision).

Please refer to FIGS. 11-14. FIG. 11 shows a comparison result of non-zero input bit counts of MSP between a conventional method (i.e., without input shaping (w/o IN-S)) and the input-shaping method 100 of the present disclosure (i.e., with input shaping (w IN-S)). FIG. 12 shows a comparison result of normalized accumulated quantization error ratios between the conventional method and the input-shaping method 100 of the present disclosure. FIG. 13 shows a comparison result of energy efficiency between the conventional method and the input-shaping method 100 of the present disclosure. FIG. 14 shows a comparison result of inference accuracy among a first method (software), a second method (only IN-S), a third method (only reduced precision) and a fourth method (with IN-S and reduced precision). In FIG. 11, the input-shaping method 100 of the present disclosure can increase the counts of full-precision sensing by 8.5% compared to the conventional method. In FIG. 12, the input-shaping method 100 of the present disclosure can decrease the accumulated quantization error caused by reduced-precision readout by 36.4% compared to the conventional method. In FIG. 13, the input-shaping method 100 of the present disclosure can improve the energy efficiency by 1.31× compared to the conventional method. In FIG. 14, the first method (software) represents that the multi-bit input signals $IN_j[7:0]$ are applied without input shaping in software simulation. The second method (only IN-S) represents that the shaped multi-bit input signals $INS_j[7:0]$ are applied with input shaping in software simulation. The third method (only reduced precision) represents that the multi-bit input signals $IN_j[7:0]$ and the reduced-precision readout are applied in hardware implementation. The fourth method (with IN-S and reduced precision) represents that the shaped multi-bit input signals $INS_j[7:0]$ and the reduced-precision readout are applied in hardware implementation. The fourth method is corresponding to the input-shaping method 100 of the present disclosure. A ResNet-20 model and a CIFAR-100 dataset are used to generate the comparison result of inference accuracy. The inference accuracy of the fourth method can be improved by 0.65% (1.09%–0.44%) compared to the third method.

According to the aforementioned embodiments and examples, the advantages of the present disclosure are described as follows.

1. In the input-shaping method and the input-shaping unit of the present disclosure, the inference accuracy can be improved without finetuning. The shaped multi-bit input signal has a higher chance of being carried to the high place value part with full-precision readout. The accumulated quantization error caused by reduced-precision readout can be decreased due to the input shaping step of the input-shaping method and the input-shaping unit.

2. Compared with the conventional CIM applications, the input-shaping method and the input-shaping unit of the present disclosure mainly reduce the energy consumption of CIM in processing the multi-bit input signal. Furthermore, the input-shaping method and the input-shaping unit of the present disclosure can improve the inference accuracy without finetuning.

3. The input-shaping method and the input-shaping unit of the present disclosure can increase the counts of full-precision sensing by 8.5% compared to the conventional method. The input-shaping method and the input-shaping unit of the present disclosure can decrease the accumulated quantization error caused by reduced-precision readout by 36.4% compared to the conventional method. The input-shaping method and the input-shaping unit of the present disclosure can improve the energy efficiency by 1.31× compared to the conventional method. The inference accuracy of the input-shaping method and the input-shaping unit of the present disclosure with input shaping can be improved by 0.65% compared to the conventional method without input shaping.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An input-shaping method for a group-modulated input scheme in a plurality of computing-in-memory applications, which is configured to shape a plurality of multi-bit input signals, and the input-shaping method for the group-modulated input scheme in the plurality of computing-in-memory applications comprising:

performing an input splitting step, wherein the input splitting step comprises splitting each of the multi-bit input signals into a plurality of input sub-groups via an input-shaping unit;

performing a threshold setting step, wherein the threshold setting step comprises setting a plurality of shaping thresholds via the input-shaping unit, wherein the shaping thresholds comprise a first round-up threshold, a round-down threshold and a second round-up threshold; and performing an input shaping step, wherein the input shaping step comprises shaping one of the input sub-groups according to the first round-up threshold and the round-down threshold, and then shaping another of the input sub-groups according to the second round-up threshold via the input-shaping unit to form a plurality of shaped multi-bit input signals so as to increase a probability of a bit equal to 0 occurring in the one and the another of the input sub-groups.

2. The input-shaping method for the group-modulated input scheme in the plurality of computing-in-memory applications of claim 1, wherein each of the multi-bit input signals and the shaped multi-bit input signals has eight bits, the input sub-groups comprise a first input sub-group, a second input sub-group and a third input sub-group, and the first input sub-group, the second input sub-group and the third input sub-group have two bits, three bits and three bits, respectively.

3. The input-shaping method for the group-modulated input scheme in the plurality of computing-in-memory applications of claim 2, wherein the input shaping step further comprises:

performing a first shaping sub-step, wherein the first shaping sub-step comprises determining whether the third input sub-group is rounded up to the second input sub-group according to the first round-up threshold, and then determining whether the third input sub-group is rounded down to 0 according to the round-down threshold; and performing a second shaping sub-step, wherein the second shaping sub-step comprises determining whether the second input sub-group is rounded up to the first input sub-group according to the second round-up threshold.

4. The input-shaping method for the group-modulated input scheme in the plurality of computing-in-memory applications of claim 3, wherein in the first shaping sub-step, in response to determining that the third input sub-group is greater than or equal to the first round-up threshold, and the second input sub-group is different from 7, adding the second input sub-group by 1, and setting the third input sub-group to 0; and in response to determining that the third input sub-group is smaller than the first round-up threshold, or the second input sub-group is equal to 7, checking whether the round-down threshold is greater than or equal to the third input sub-group.

5. The input-shaping method for the group-modulated input scheme in the plurality of computing-in-memory applications of claim 4, wherein in the first shaping sub-step, in response to determining that the round-down threshold is greater than or equal to the third input sub-group, setting the third input sub-group to 0.

6. The input-shaping method for the group-modulated input scheme in the plurality of computing-in-memory applications of claim 5, wherein in the second shaping sub-step, in response to determining that the second input sub-group is greater than or equal to the second round-up threshold, and the first input sub-group is different from 3, adding the first input sub-group by 1, and setting the second input sub-group and the third input sub-group to 0.

7. The input-shaping method for the group-modulated input scheme in the plurality of computing-in-memory applications of claim 1, wherein in the threshold setting step, setting the first round-up threshold, the round-down threshold and the second round-up threshold to 5, 3 and 7, respectively.

8. An input-shaping method for a group-modulated input scheme in a plurality of computing-in-memory applications, which is configured to shape a plurality of multi-bit input signals, and the input-shaping method for the group-modulated input scheme in the plurality of computing-in-memory applications comprising:
performing an input splitting step, wherein the input splitting step comprises splitting the multi-bit input signals into a plurality of input sub-groups via an input-shaping unit;
performing a threshold setting step, wherein the threshold setting step comprises setting at least one shaping threshold via the input-shaping unit; and
performing an input shaping step, wherein the input shaping step comprises shaping at least one of the input sub-groups according to the at least one shaping threshold via the input-shaping unit to form a plurality of shaped multi-bit input signals so as to increase a probability of a bit equal to 0 occurring in the at least one of the input sub-groups.

9. The input-shaping method for the group-modulated input scheme in the plurality of computing-in-memory applications of claim 8, wherein each of the multi-bit input signals and the shaped multi-bit input signals has eight bits, the input sub-groups comprise a first input sub-group, a second input sub-group and a third input sub-group, and the first input sub-group, the second input sub-group and the third input sub-group have two bits, three bits and three bits, respectively.

10. The input-shaping method for the group-modulated input scheme in the plurality of computing-in-memory applications of claim 9, wherein,
the at least one shaping threshold comprises a first round-up threshold and a round-down threshold; and
the input shaping step further comprises determining whether the third input sub-group is rounded up to the second input sub-group according to the first round-up threshold, and then determining whether the third input sub-group is rounded down to 0 according to the round-down threshold.

11. The input-shaping method for the group-modulated input scheme in the plurality of computing-in-memory applications of claim 10, wherein in the threshold setting step, setting the first round-up threshold and the round-down threshold to 5 and 3, respectively.

12. The input-shaping method for the group-modulated input scheme in the plurality of computing-in-memory applications of claim 10, wherein in the input shaping step,
in response to determining that the third input sub-group is greater than or equal to the first round-up threshold, and the second input sub-group is different from 7, adding the second input sub-group by 1, and setting the third input sub-group to 0; and
in response to determining that the third input sub-group is smaller than the first round-up threshold, or the second input sub-group is equal to 7, checking whether the round-down threshold is greater than or equal to the third input sub-group.

13. The input-shaping method for the group-modulated input scheme in the plurality of computing-in-memory applications of claim 12, wherein in the input shaping step,
in response to determining that the round-down threshold is greater than or equal to the third input sub-group, setting the third input sub-group to 0.

14. The input-shaping method for the group-modulated input scheme in the plurality of computing-in-memory applications of claim 9, wherein,
the at least one shaping threshold comprises a second round-up threshold; and
the input shaping step further comprises determining whether the second input sub-group is rounded up to the first input sub-group according to the second round-up threshold.

15. The input-shaping method for the group-modulated input scheme in the plurality of computing-in-memory applications of claim 14, wherein in the threshold setting step, setting the second round-up threshold to 7.

16. The input-shaping method for the group-modulated input scheme in the plurality of computing-in-memory applications of claim 14, wherein in the input shaping step,
in response to determining that the second input sub-group is greater than or equal to the second round-up threshold, and the first input sub-group is different from 3, adding the first input sub-group by 1, and setting the second input sub-group and the third input sub-group to 0.

17. An input-shaping unit for a group-modulated input scheme in a plurality of computing-in-memory applications, which is configured to shape a plurality of multi-bit input signals, and the input-shaping unit for the group-modulated input scheme in the plurality of computing-in-memory applications comprising:
a comparing circuit configured to receive the multi-bit input signals and a plurality of shaping thresholds, wherein each of the multi-bit input signals are split into a plurality of input sub-groups, and the comparing circuit is configured to compare the input sub-groups with the shaping thresholds to generate a plurality of comparison results; and
a logic circuit electrically connected to the comparing circuit, wherein the logic circuit is configured to generate a plurality of shaped multi-bit input signals according to the comparison results;
wherein the shaping thresholds comprise a first round-up threshold, a round-down threshold and a second round-up threshold, the comparing circuit is configured to compare one of the input sub-groups with the first round-up threshold and the round-down threshold to generate one of the comparison results, the comparing circuit is configured to compare another of the input sub-groups with the second round-up threshold to generate another of the comparison results, and the logic circuit is configured to generate the shaped multi-bit input signals according to the one and the another of the comparison results so as to increase a probability of a bit equal to 0 occurring in the one and the another of the input sub-groups.

18. The input-shaping unit for the group-modulated input scheme in the plurality of computing-in-memory applications of claim 17, wherein each of the multi-bit input signals and the shaped multi-bit input signals has eight bits, the input sub-groups comprise a first input sub-group, a second input sub-group and a third input sub-group, and the first input sub-group, the second input sub-group and the third input sub-group have two bits, three bits and three bits, respectively.

19. The input-shaping unit for the group-modulated input scheme in the plurality of computing-in-memory applications of claim 18, wherein the comparing circuit comprises:
a first comparator configured to compare the third input sub-group with the first round-up threshold;
a second comparator configured to compare the second input sub-group with 7;
a third comparator configured to compare the round-down threshold with the third input sub-group;
a fourth comparator configured to compare the second input sub-group with the second round-up threshold; and
a fifth comparator configured to compare the first input sub-group with 3.

20. The input-shaping unit for the group-modulated input scheme in the plurality of computing-in-memory applications of claim 19, wherein,
in response to determining that the third input sub-group is greater than or equal to the first round-up threshold, and the second input sub-group is different from 7, the third input sub-group is set to 0, and the second input sub-group is added by 1;
in response to determining that the round-down threshold is greater than or equal to the third input sub-group, the third input sub-group is set to 0; and
in response to determining that the second input sub-group is greater than or equal to the second round-up threshold, and the first input sub-group is different from 3, the second input sub-group and the third input sub-group are set to 0, and the first input sub-group is added by 1.

* * * * *